United States Patent [19]

Knab et al.

[11] Patent Number: 5,714,853
[45] Date of Patent: Feb. 3, 1998

[54] METHOD OF MONITORING MOVEMENT PATH OF PART

[75] Inventors: Norbert Knab, Appenweier; Holger Pruessel, Buehlertal, both of Germany

[73] Assignee: Robert Bosch GmbH, Stuttgart, Germany

[21] Appl. No.: 717,421

[22] Filed: Sep. 20, 1996

[30] Foreign Application Priority Data

Oct. 25, 1995 [DE] Germany ............ 195 39 578.6

[51] Int. Cl.$^6$ .................. E05F 15/16; H02P 3/00; G05B 9/02
[52] U.S. Cl. .................. 318/265; 318/286; 318/466; 318/467; 318/266; 49/28
[58] Field of Search .................. 318/280–293, 318/440–470, 489, 603; 49/28, 349, 26, 31

[56] References Cited

U.S. PATENT DOCUMENTS

| | | | |
|---|---|---|---|
| 4,641,067 | 2/1987 | Iizawa et al. | 318/287 |
| 4,900,994 | 2/1990 | Mizuta | 318/283 |
| 5,128,597 | 7/1992 | Kokubu | 318/286 |
| 5,351,439 | 10/1994 | Takeda et al. | 49/28 |
| 5,404,673 | 4/1995 | Takeda et al. | 49/28 |
| 5,410,226 | 4/1995 | Sekiguchi et al. | 318/266 |
| 5,422,551 | 6/1995 | Takeda et al. | 318/265 |
| 5,436,539 | 7/1995 | Wrenbeck et al. | 318/265 |
| 5,459,379 | 10/1995 | Takeda et al. | 318/469 |
| 5,483,133 | 1/1996 | Takabe et al. | 318/466 |
| 5,483,135 | 1/1996 | Parks | 318/469 |
| 5,530,329 | 6/1996 | Shigematsu et al. | 318/469 |
| 5,543,693 | 8/1996 | Janca et al. | 318/283 |
| 5,610,484 | 3/1997 | Georgin | 318/286 |

FOREIGN PATENT DOCUMENTS

3034118C2  12/1983  Germany.

*Primary Examiner*—Paul Ip
*Attorney, Agent, or Firm*—Michael J. Striker

[57] ABSTRACT

A movement path of a part which is movable by a drive relative to at least one end position is monitored by monitoring the drive, and turning off or reversing the drive is performed in dependence on the exceeding of at least one predetermined parameter. The movement path of the path is subdivided into regions in which different influences are performed. In particular, the movement path is subdivided into five regions in which a different drive force limiting (closing force limiting) of the drive is performed.

8 Claims, 1 Drawing Sheet

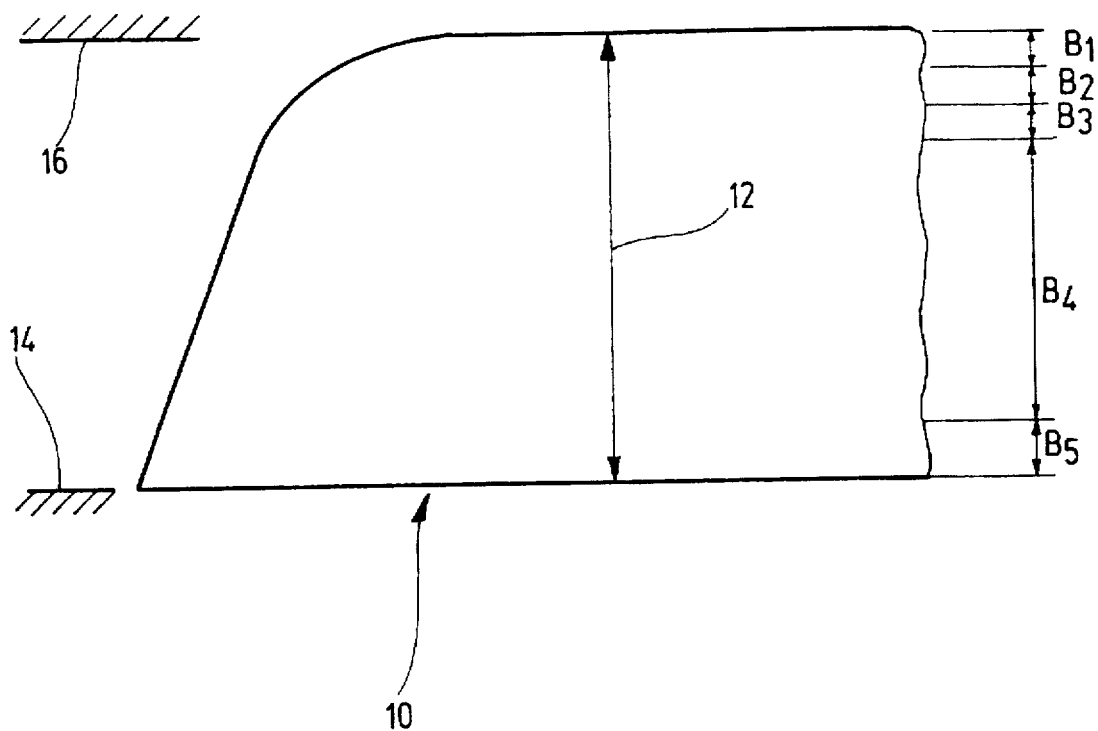

METHOD OF MONITORING MOVEMENT PATH OF PART

BACKGROUND OF THE INVENTION

The present invention relates to a method of monitoring a movement part.

More particularly, it relates to a method of monitoring a movement path of a part which is movable by a drive relative to at least one end position, a monitoring of the drive is performed, and depending on the exceeding of at least one predetermined parameter, a turning-off or reversing the drive is performed.

It is known to move parts by a drive along a movement path. Depending on the application, the part is movable relative to at least one end position. For example, in motor vehicles the electrically actuatable window openers or electrically actuatable sliding roofs are reciprocatingly movable by an electric drive supplied from the board system, between two end positions including a closed position and an open position. In particular, during the closing process of the part, them is a danger of clamping between the movable part and the end abutment which can lead to an injury of body parts caught in the movement path of the movable part.

The German patent document DE 30 34 118 C2 discloses a method for electrical monitoring of the opening and closing processes of electrically operating aggregates, in particular window openers and sliding roofs in motor vehicles. In this reference the movement path is subdivided into three regions in which the moved part is stopped or reversed when a blocking object is appeared. The blocking condition of the part is detected by the change of the movement speed of the part or of the drive.

SUMMARY OF THE INVENTION

Accordingly, it is an object of present invention to provide a method of monitoring a movement path of the part which is a further improvement of the existing methods.

In keeping with these objects and with others which will become apparent hereinafter, one feature of the present invention resides, briefly stated, in a method of monitoring of a movement path of a part, in accordance with which the movement path is subdivided into five regions in which a different drive force limiting (closing force limiting) of the drive is performed.

When the method is performed in accordance with present invention, the monitoring of the movement path of the part can be performed over the total movement path.

The inventive method is advantageous in particular for the window openers and sliding roofs in the motor vehicles since the clamping protection function is guaranteed up to the point of running the window or the sliding roof to the guide or the seal coinciding with the end position. Since the movement path is subdivided into five regions in which a different drive force limit of the drive is performed, the drive force limit can be realized by the division of the regions up to the point of the movement path in which the last possible theoretical clamping risk can occur. In the region of the movement path located between the last possible point of the theoretical clamping risk and the end abutment a drive force limit can be maintained. Thereby a reliable movement of the part to its end position, in particular a safety closing of the window opener or the sliding groove is guaranteed, and so that during covering of the last region of the movement path, the friction forces occurring due to guides and seals do not lead to a drive force limit.

In accordance with another feature of the present invention, the part is reciprocatingly movable between two end positions, and in the regions immediately adjoining the end positions, no drive force limiting is performed.

In accordance with still another feature of the present invention, in three further regions located between the outer regions, different drive force limiting is performed.

In accordance with still a further feature of present invention, the boundaries between the regions are adjusted via the drive after the first movement of the path relative to the end position.

The drive force limiting can be performed in dependence on a force counteracting the movement of the part and/or a spring rate associated with the force. In one region a drive force limiting is performed by a force of maximum 100N and a spring rate of 20 N/mm. In the other region, a drive force limiting is performed with a force of maximum 100N and a spring rate of 20–65 N/mm. Finally, in a further region the drive force limiting is performed with a force of greater than 100N independently from a spring rate.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view schematically showing a movement path of a window opener for which a method in accordance with the present invention is implemented.

DESCRIPTION OF PREFERRED EMBODIMENTS

A window 10 of a not shown motor vehicle is illustrated in the drawing. The window 10 is actuatable by a window opener which is driven by an electric motor. The window 10 is reciprocatingly movable along its movement path 12 between two end positions 14 and 16. The operation of the electrical window openers is generally known and therefore not illustrated in detail. The showing of the drive device, the guide and the seal of the window in a motor vehicle door are dispensed with for better representation of the process. The window 12 is movable by its electric drive toward the abutment 16 in a closing direction and toward the abutment 14 in the opening direction.

The movement path 12 is subdivided into the regions B1, B2, B3, B4 and B5. The boundaries between the individual regions B1–B5 can be defined by the drive of the window 10. During the first actuation of the window 10, it moves toward its upper abutment 16. Simultaneously a counter which is coupled with the drive shaft of the drive is standardized, or in other words set to 0. In correspondence with a selectable fixable number of revolutions of the driver shaft which are detectable by corresponding means such as sensors, the boundaries between the regions B1–B5 are defined.

During opening of the window 10, or in other words during movement in direction toward the lower abutment 14 along the movement path 12, the boundary between the regions B1 and B2 is defined in accordance with a number of revolutions of the drive shaft. The boundary between the regions B2 and B3 is defined after the number of revolutions N+x1, the boundary between the regions B3 and B4 is defined after the number of revolutions N+x2, and the boundary between the regions B4 and B5 is defined after the number of revolutions N+x3. Here the x3 is greater than the x2, and the x2 is greater than the x1. These region definitions for the regions B1–B5 can be performed separately for each application and supplied to a corresponding storage means cooperating with the drive of the window 10.

During the predetermined use of the window 10 in particular during the closing process or in other words when the window 10 moves along the movement path 12 from its lower end position 14 to its upper end position 16, it is possible that for example a body part of a vehicle occupant can be subjected during an automatically performed closing process to a substantial injury danger. In the moment when a body part reaches in the movement path 12, it applies a force F which counteracts the closing force of the window. Depending on which body part enters the movement path 12, for example tissue parts or a bone region, it has a predetermined elasticity with which a predetermined spring rate FR is associated in correspondence with the actually occurring force F and/or the actually occurring spring rate FR, and the subdivision of the movement path 12 into the regions B1–B5 can be performed so that in the regions B1–B5 a different influence of the drive of the window 10 is performed. Through the influence of the drive of the window 10, a known closing force limiting is performed, which prevents or substantially reduces a clamping of the body parts and thereby an injury danger.

In accordance with the present invention, no closing force limiting is performed in the outer regions B1 and B5, or in other words, in the region which are located immediately near the lower abutment 14 or the upper abutment 16. Thereby it is possible that the window 10, despite an occurring force F caused in particular by a guide or a sealing rubber or sealing felt in which the window runs during its movement, the closing force limiting is not activated and the window can reliably close.

In the central regions B2, B3, B4, an adjustment of the closing force limiting is performed so that in the region B4 the closing force limiting is released with a force F of maximum 100N and a spring rate less than 20 N/Mm. The release of the closing force limiting means that the window 10 is stopped or reversed in its movement along the movement path 12, or in other words is moved opposite. In the region B3 the activation of the closing force limiting is adjusted so that it is released with an occurring force F of maximum 100N and a spring rate of greater than 20–65 N/mm. In the region B2 a closing force limiting is performed with the occurring forces F greater than 100N independently from an occurring spring rate. With the base adjustment it is provided that the closing force limiting is activated in the regions B2, B3, and B4 with a so-called pulse actuation of the window 10. By single short-time activations of a corresponding switching means, the automatic closing or opening process of the window 10 is set in operation.

During a manual actuation of the window 10, or in other words during the closing or opening of the window 10, a switching means is permanently held actuated. The closing force limiting can be selectively dispensed with since by a simple release of the switching means a holding of the window 10 is possible.

The present invention is not limited to the shown embodiment. For example, the subdivision of the movement past 12 in the regions B1–B5 with the regions B2–B4 having a closing force limiting and the regions B1 and B5 having no closing force limiting, can be also utilized for electrically actuatable sliding roofs in motor vehicles or other parts movable relative at least one end position.

It will be understood that each of the elements described above, or two or more together, may also find a useful application in other types of constructions differing from the types described above.

While the invention has been illustrated and described as embodied in method of monitoring movement path of part, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A method of monitoring a movement path of a part movable by a drive between two end positions, comprising the steps of monitoring a drive; performing a switching or reversing of the drive in dependence on exceeding of at least one predetermined parameter; subdividing a total movement path of the part into regions in which a different influence is performed, said subdividing including subdividing the movement path into five regions in which a different drive force limiting of the drive is performed; performing no drive force limiting in regions which directly adjoin the end positions; and performing different drive force limiting in three regions located between two outer regions.

2. A method as defined in claim 1; and further comprising the step of adjusting boundaries between the regions via the drive after a first movement of the part relative to the end position.

3. A method as defined in claim 1; and further comprising the step of performing the drive force limiting in dependence on a force which counter acts the movement of the part.

4. A method as defined in claim 1; and further comprising the step of performing the drive force limiting in dependence on a spring rate associated with a force counter acting the movement of the part.

5. A method as defined in claim 3, and further comprising the step of performing the drive force limiting in dependence on a spring rate associated with a force counter acting the movement of the part.

6. A method as defined in claim 1; and further comprising the step of performing a drive force limiting in one region with a force of maximum 100N and a spring rate of less than 20 N/mm.

7. A method as defined in claim 1; and further comprising the step of performing a drive force limiting in another region with a force of maximum 100N and a spring rate of 20–65 N/mm.

8. A method as defined in claim 1; and further comprising the step of performing a drive force limiting in a further region with a force of greater than 100N independently from a spring rate.

* * * * *